Patented June 20, 1933

1,915,065

UNITED STATES PATENT OFFICE

VINCENT T. MALCOLM, OF INDIAN ORCHARD, MASSACHUSETTS, ASSIGNOR TO THE CHAPMAN VALVE MANUFACTURING COMPANY, OF INDIAN ORCHARD, MASSACHUSETTS, A CORPORATION OF MASSACHUSETTS

CREEP RESISTANT NONCORROSIVE STEEL

No Drawing.   Application filed April 21, 1932. Serial No. 606,767.

This invention relates to an alloy steel which has low creep at elevated temperatures and pressures, and is a continuation-in-part of my co-pending application, Serial Number 490,333, filed Oct. 21, 1930, in which I have described and claimed a metal alloy which resists corrosion, scaling and deterioration at temperatures of the order of 1200° F. and at high pressures, and maintains high tensile strength above 1000° F., together with good resistance against attack of corrosive sulphur-containing liquids and gases under conditions such as are met with in high pressure steam and oil lines, oil refinery equipment, valves and fittings for pipe lines, and the like. The invention comprehends a steel containing chromium and tungsten as its major alloying elements, and apparatus including valves, pipe lines, and oil refinery equipment produced from such a steel; more specifically, a pearlitic steel containing chromium, tungsten, and carbon in certain critical proportions, all of which is hereinafter described and claimed.

Under present day industrial conditions, processes are being carried out at exceedingly high temperatures and pressures, and it has been most difficult to find steels and other materials suitable for apparatus or equipment, that are able to withstand the strenuous and severe conditions of operation. For example, oil cracking operations or gas polymerizing operations often require temperatures of the order of 100° F. and pressures approximating 300 to 1000 pounds per square inch; other organic syntheses are carried out under similar severe conditions, and it will be recognized that materials and chemical compounds are far more corrosive under such conditions than they are at normal temperatures and pressures. It will also be appreciated that steels and alloys ordinarily suitable to resist corrosion and stress at normal temperatures and pressures are unsuitable for the conditions enumerated.

One of the most important requirements of a steel or alloy for high temperature use is that it have a low rate of flow or the ability to carry loads continuously without appreciable deformation or at least without harmful permanent deformation. The capacity of a steel to withstand stress changes markedly as the temperature and time of use increases; for example, the results of short time tests at temperatures above 700° F. are very inadequate criteria of continuous load carrying capacity at those temperatures. At ordinary temperature, steel flows or yields quickly, if at all, under applied load, and yielding may be easily observed and measured in the usual tensile test, but at higher temperatures, steel may flow continuously under load, and in some cases, so slowly as to almost avoid detection, the first sign of such flow often being a failure by sudden rupture at loads considerably below those withstood at higher temperatures in a short time test.

Extensive investigation into the "creep" or "flow" of metal has demonstrated that for each composition of steel there is a range of stresses upward of zero, the continuous application of which does not produce rupture at least within reasonable periods of time and for each of which there is, speaking approximately, a limit of deformation which also is not exceeded within reasonable periods of time. We may call these ranges of stress, "creep" limit stresses; viz., the stresses at which certain limiting values of creep are not exceeded (within reasonable periods of time). Thus a 1% "creep" limit stress at 1000° F. is that stress which may be safely applied, probably indefinitely, without ruptures and without more than 1% deformation.

However, a steel for high temperature use requires other suitable properties in addition to good creep resistance, and resistance to furnace gases and oxidizing conditions together with a permanence of structure, so that no deterioration takes place, are necessary. Large grain growth, and hardening due to temperature, are to be avoided. Proper thermal expansion, resistance to wear and shock as well as non-brittleness together with good physical properties are important adjuvants. Aside from these considerations, a steel for commercial use should also be priced low enough to be economically valuable. Up to the present time, it was thought that alloy steels of the austenitic type were the only ones of value where creep resistance at temperatures over 1000° F. was necessary.

With the advent of high chromium stainless irons and steels containing chromium in quantity above 9%, attempts were made to use such stainless materials in high temperature equipment, on account of their known resistance to corrosion at atmospheric temperatures and pressures. Aside from the fact that fabrication and mechanical working of such steels is more difficult than plain carbon steels, the stainless compositions show pronounced changes in structure at high temperature operation and do not have the creep resistance at high temperatures that one would expect in view of their excellent properties under ordinary conditions. While their creep resistance is a little higher than plain carbon steel, the comparative costs are not in the same proportion, so that such stainless steels are not considered suitable for the present enumerated purposes. There have been prior proposals directed toward the use of high chrome-nickel steels of the austenitic type for high temperature and pressure work, and while such austenitic compositions show good resistance to corrosion, they are not fool-proof in the matter of physical stability at high temperatures. It is well known that the effect of mechanical work on this type of steel influences the yield point, tensile strength and ductility, and this probably accounts for some of the unstability and change of grain structure experienced by these structures at high temperatures, and the preworking of these materials is of considerable importance as to the observation of delicate and narrow critical temperatures. I have found that while these austenitic steels have good corrosion resistance, when they are heated above say 1100° F. they are apt to rupture under load without warning. In other words, the yield point and the point of ultimate strength closely approximate each other so that when creep takes place to a noticeable degree, rupture suddenly occurs. This is a distinctly disadvantageous feature, as workers and attendants of the apparatus are endangered by the sudden failure of equipment without any signs of warning. Another characteristic, therefore, which a steel suitable for the present work should have is a substantial difference between the yield point and ultimate strength, so that when yielding or bulging takes place, the apparatus can be dismantled and replacements made before final rupture takes place. In other words, high ductility at high temperature is important.

I have discovered that contrary to the generally accepted teachings of the art that a non-austenitic steel containing chromium, tungsten and carbon, all within a critical range of proportions as hereinafter described, possesses strength and ductility at high temperatures, good thermal conductivity, a coefficient of expansion approximating plain carbon steel, good anti-fatigue characteristics and ability to withstand working stresses, and good welding and fabrication properties.

One of the most important characteristics of the new alloy entity of my invention is its absence of a brittle range at temperatures from 900° F. to 1500° F., together with a warning or indication of impending failure as distinguished from sudden rupture. In addition, the novel alloy has good scale resistance to hot oxidation as well as good resistance to corrosion of sulphur and hydrogen sulfide compounds generally occurring in sour oils, or in sulphuretted salt water. The alloy steel of this invention is not only more serviceable than austenitic chromium nickel steels at high temperatures, but it is also lower in cost and cheaper to produce thus permitting it to replace with economical advantage cheaper as well as more expensive steels.

I have discovered that a new entity comprising chromium, tungsten, and carbon in steel results if the proportions of these ingredients are kept within certain definite critical ranges. Each of the elements chromium, tungsten and carbon have been previously used in various steels and alloys, and each of their properties and characteristics conferred on steel has been well recognized, but I believe I am the first in the art to produce the hereindescribed new entity containing these elements in critical proportions and I further believe that I am the first to recognize that such an entity can be used with tremendous advantage in high temperature or high pressure apparatus and equipment, particularly pipe valves and fittings therefor, steam and oil lines, oil refinery equipment including cracking stills and converter tubes, such as are subject to corrosion and erosion of oil and steam products. I have discovered that chromium in amount ranging from 4.00% to 8.00% together with tungsten in amount from .75% to 2.00% and together with carbon from a trace to .50% incorporated as alloying elements in steel produce the new entity having the hereindescribed properties. Specifically, these are the essential and major alloying ingredients, and an analysis of the new entity broadly is as follows:

Carbon_____ Trace to 0.50%
Chromium_____ 4.00% to 8.00%
Tungsten_____ .75 to 2.00%
Iron_____ Substantial balance.

It will be understood that silicon, manganese, sulphur and phosphorus will be present in fortuitous amounts incidental to usual metallurgical production methods. For example, silicon will be higher if an acid furnace is used rather than a basic furnace, but a silicon content below .50% is preferred, under any conditions, as silicon is not relied upon as an essential element. Manganese may be present in amounts preferably below .60%, or it may be replaced by any other suitable deoxidizer or scavenger used in the steel industry. An example of a suitable range which includes both essential and non-essential elements is as follows:

| | |
|---|---|
| Carbon | Trace to 0.50% |
| Chromium | 4.00 to 8.00% |
| Tungsten | .75 to 2.00% |
| Manganese | .60% maximum |
| Sulphur | .05% maximum |
| Phosphorus | .05% maximum |
| Silicon | .50% maximum |
| Iron | Substantial balance. |

Within narrower limits, the following analysis may be specified:

| | |
|---|---|
| Carbon | .05% to .50% |
| Chromium | 4.50% to 6.50% |
| Tungsten | .75% to 1.50% |
| Silicon | .50% maximum |
| Iron | Substantial balance. |

Other analyses of this steel as actually found in commercial tonnage are as follows:

No. 1

| | Per cent |
|---|---|
| Carbon | .15 |
| Manganese | .43 |
| Silicon | .12 |
| Chromium | 5.89 |
| Tungsten | .69 |
| Sulphur | .015 |
| Phosphorus | .019 |

No. 2

| | Per cent |
|---|---|
| Carbon | .25 |
| Manganese | .53 |
| Silicon | .42 |
| Chromium | 5.87 |
| Tungsten | .80 |
| Sulphur | .017 |
| Phosphorus | .021 |

No. 3

| | Per cent |
|---|---|
| Carbon | .25 |
| Chromium | 6.00 |
| Tungsten | 1.00 |
| Manganese | .50 |
| Sulphur | .05 |
| Phosphorus | .05 |
| Silicon | .30 |

It will be seen from the above that tungsten is an important element of the alloy, and silicon is an unimportant element of the alloy. In other words, silicon may be dispensed with, but tungsten is necessary. I have conducted numerous experiments in an effort to replace tungsten with what has generally been considered its equivalent, namely, molybdenum, and I have found that while some molybdenum may be used at ordinary atmospheric temperatures and pressures, molybdenum is unsuitable at high temperatures as it causes a peculiar banded structure in the metal, possibly due to vaporization of free molybdenum not held in solid solution, or from the grain boundaries. Furthermore, the use of molybdenum without tungsten seems to cause minute hair-line cracks and to intensify undesirable air-hardening, and carbide segregation.

While I do not wish to limit myself to any theory, I believe that the tungsten coacts with the chromium and carbon to inhibit grain growth at high temperatures, thus stabilizing the metallic structure and preventing deterioration at the grain boundaries or thru the grains themselves, the net result being an absence of a brittle range in the plastic or near plastic condition. This seems to be contrary to the teachings in the alloy steel art where high speed steels containing tungsten for red hardness properties were considered delicately brittle under stress, while in the present entity the tungsten seems to inhibit brittleness under the conditions of operation.

It is desirable that nickel be omitted from my alloy steel although it will be realized that fortuitous amounts of the same may be present in steel scrap, but not in sufficient quantity to produce an effect. It is known that nickel ordinarily intensifies chromium but I have found that for high temperature and pressure work, it is undesirable in the present entity. This is contrary to what has heretofore been generally believed, as the trend in the art has been to attempt to master the difficulties of high chromium steels for such purposes by adding nickel thereto either with or without silicon. My theory is that under high temperature and/or pressure conditions, particularly in oil refining operations, including for instance, vapor phase cracking of hydrocarbons, any sulphur present in the hydrocarbon compounds in chemical combination with carbon, is apparently broken down with carbon deposition due to catalytic effect of nickel present. Regardless of theory, however, the facts are that high chromium steels containing nickel have a brittle range between 900° to 1200° F. and failure occurs at these temperatures without warning. High chromium steels without nickel have an excessive grain growth at 900° F. and are also unsuitable. Low chrome-nickel steels do not have any load carrying ability nor good corrosive resistance above 900° F., while plain carbon steels above 750° F. have low load carrying ability and are also corrosive.

It will be seen that by working contrary to the teachings of the prior art in the utilization of lower chromium than the stainless range, elimination of nickel which had been considered indispensable, and the use of tungsten to prevent brittleness failure, I have provided a combination of anomalies to produce a new entity having paradoxical characteristics, most unusual and unexpected, together with a low cost product. This steel can be cast, forged, rolled, and stamped; it machines well, and the metallurgy of the same is comparatively simple, so that there are no real difficulties in production. It is useful for tanks, evaporators, tubes, valves, and other equipment that is subject to corrosion, heavy sliding pressures, and/or to hot oxidation. This steel is thermally and mechanically stable, and while it may be used in its annealed condition, I prefer to subject the same to any suitable heat treatment adapted for the exigencies of any required service. As an example, a normalizing treatment at 1750° F. followed by drawing at 1200° to 1250° F. produced the following physical properties:

| | |
|---|---|
| Tensile strength | 125,000 # per sq. in. |
| Yield point | 100,000 # per sq. in. |
| Elongation in 2 inches | 18% |
| Reduction of area | 45% |
| Brinell hardness | 240–260 |

The normalizing temperature may be varied from 1650° to 1850° F., and the drawing temperature in accordance therewith. An oil quench at 1500° to 1600° F. or even lower may also be used.

The steel of my invention has a high tensile strength, withstands a reasonable amount of cold working without impairment, withstands corrosive action of high temperature flue gases from fuels containing sulphur, has ductility at 1300° F. and a stress of 10,000 pounds per square inch at 1000° F. in 100,000 hours does not product a rate of creep of more than 1%.

The carbon content of the steel may be varied up to .50% as desired, but I prefer to maintain it from .10% to .25%.

I claim:

1. A valve for high temperature or pressure steam and oil lines, said valve having a component thereof consisting of an alloy steel comprising as essential chromium from 4.00% to 8.00%, tungsten from .75% to 2.00%, silicon from trace to .30% and carbon up to .50%, the balance iron.

2. As a new product, low creep alloy steel resistant to the action of gases at high temperatures and pressures and stable or non-brittle at temperatures of the order of 1200° F. including chromium from 4.00% to 8.00%, tungsten from .75% to 2.00%, silicon from trace to .30%, and carbon up to .50%, the balance iron.

3. As a new entity, an alloy steel having low creep consisting of chromium from 4.00% to 8.00%, tungsten from .75% to 2.00%, silicon from trace to .30%, and carbon in appreciable amount up to .50%, the remainder being iron.

4. Oil refinery apparatus comprising an alloy steel resistant to creep and capable of withstanding severe pressures at 1200° F. and composed of chromium from 4.00% to 8.00%, tungsten from .75% to 2.00%, silicon from trace to .30%, and carbon in appreciable amount up to .50%, the remainder being iron.

5. A new low creep alloy steel highly resistant to hydrogen sulfide and stable at high temperatures and pressures consisting of chromium from 4.00% to 8.00,% tungsten from .75% to 2.00%, silicon from trace to .30%, and carbon in appreciable amount up to .50%, and iron the remainder.

6. As a new article of manufacture, an alloy steel resistant to creep and to corrosion of hydrogen sulfide, stable and non-brittle at temperatures of the order of 1200° F. and at high pressures, comprising as essential elements chromium from 4.00% to 8.00%, tungsten from .75% to 2.00%, silicon from trace to .30%, and carbon in appreciable amount up to .50%, iron constituting the balance.

7. As a new article of manufacture, a hydrogen sulfide resistant alloy steel of low creep value containing chromium from 4.00% to 8.00%, tungsten from .75% to 2.00%, silicon from trace to .30%, and carbon from .15% to .50%, the tungsten inhibiting grain growth of the chromium at high temperatures and pressures, whereby the alloy is stable at 1200° F, the balance constituting iron.

8. A pearlitic creep-resistant alloy steel comprising carbon .05% to .50%, chromium from 4.00% to 8.00%, tungsten from .75% to 2.00%, and the balance iron, except for fortuitous amounts of other elements incidental to manufacturing, any silicon present being below .30%.

9. A low creep sulphur resistant alloy steel containing .05% to .50% carbon, 4.50% to 6.50% chromium, .75% to 1.50% tungsten, and the balance iron, except for fortuitous amounts of manganese, silicon, sulphur and phosphorus, the silicon being below .30%.

10. A low creep alloy steel of high corrosion resistance containing carbon below .50%, chromium 6.00%, tungsten 1%, and the balance iron except for incidental impurities, any silicon present being below .30%.

In testimony whereof, I hereunto set my hand.

VINCENT T. MALCOLM.